United States Patent [19]

Remus

[11] Patent Number: 5,510,045
[45] Date of Patent: Apr. 23, 1996

[54] ALKALINE DIAMINE TRACK LUBRICANTS

[75] Inventor: Christian A. Remus, Detroit, Mich.

[73] Assignee: Diversey Corporation, Ontario, Canada

[21] Appl. No.: 217,978

[22] Filed: Mar. 25, 1994

Related U.S. Application Data

[63] Continuation-in-part of Ser. No. 83,632, Jun. 28, 1993, Pat. No. 5,441,654, which is a continuation-in-part of Ser. No. 802,842, Dec. 6, 1991, Pat. No. 5,223,162, which is a continuation-in-part of Ser. No. 535,473, Jun. 8, 1990, Pat. No. 5,073,280, which is a continuation-in-part of Ser. No. 398,542, Aug. 25, 1989, Pat. No. 5,009,801, which is a continuation-in-part of Ser. No. 218,893, Jul. 14, 1988, Pat. No. 4,929,375.

[51] Int. Cl.$^6$ .................. C10M 173/02; C10M 133/04
[52] U.S. Cl. .............. 252/49.3; 252/50; 252/51.5 R
[58] Field of Search ............................... 252/49.3

[56] References Cited

U.S. PATENT DOCUMENTS

| | | | |
|---|---|---|---|
| 4,795,581 | 1/1989 | Nieh et al. ................. | 252/77 |
| 4,929,375 | 5/1990 | Rossio et al. ............... | 252/49.3 |
| 4,978,466 | 12/1990 | Sirotenko et al. ........... | 252/49.3 |
| 5,009,801 | 4/1991 | Wider et al. ................ | 252/33.2 |
| 5,062,978 | 11/1991 | Weber et al. ............... | 252/49.3 |
| 5,073,280 | 12/1991 | Rossio et al. ............... | 252/49.3 |
| 5,132,046 | 7/1992 | Edebo et al. ............... | 252/49.3 |
| 5,202,037 | 4/1993 | Lavelle et al. .............. | 252/33.6 |
| 5,223,162 | 6/1993 | Rossio ....................... | 252/33.2 |
| 5,244,589 | 9/1993 | Liu et al. .................... | 252/49.3 |
| 5,282,992 | 2/1994 | Reichgott .................... | 252/49.3 |

*Primary Examiner*—Ellen M. McAvoy
*Attorney, Agent, or Firm*—Weintraub DuRoss & Brady

[57] ABSTRACT

Alkaline diamine track lubricants for use with glass, aluminum and two-piece PET containers and other articles of manufacture are prepared from an admixture of an alkyl diamine and a water-soluble hydrotrope. The diamine lubricants are prepared without the neutralization thereof and have a corrosion inhibitor which is, preferably, a reducing agent and a biocide incorporated thereinto. A source of alkalinity may be employed, as well, to maintain the pH above 8.

15 Claims, No Drawings

ALKALINE DIAMINE TRACK LUBRICANTS

CROSS-REFERENCE TO RELATED APPLICATIONS

This application is a continuation-in-part application of U.S. patent application Ser. No. 08/083,632, entitled "LUBRICANT COMPOSITION", filed Jun. 28, 1993, now U.S. Pat. No. 5,441,654 which is hereby incorporated by reference which, in turn, is a continuation-in-part application of U.S. patent application Ser. No. 07/802,842, filed on Dec. 6, 1991, entitled "BOTTLE WASHING COMPOSITION FOR INHIBITING STRESS CRACKING AND METHOD OF USING SAME", now U.S. Pat. No. 5,223,162, the disclosure which is hereby incorporated by reference and which, in turn, is a continuation-in-part application of U.S. patent application Ser. No. 535,473, filed Jun. 8, 1990, for "COMPOSITION FOR INHIBITING STRESS CRACKS IN PLASTIC ARTICLES AND METHODS OF USE THEREFOR", now U.S. Pat. No. 5,073,280, the disclosure of which is hereby incorporated by reference and which, in turn, is a continuation-in-part of U.S. patent application Ser. No. 398,542, filed Aug. 25, 1989 for "COMPOSITIONS FOR PREVENTING STRESS CRACKS IN POLY (ALKYLENE TEREPHTHALATE) ARTICLES AND METHODS OF USE THEREFOR", now U.S. Pat. No. 5,009,801, the disclosure of which is hereby incorporated by reference and which, in turn, is a continuation-in-part application of U.S. patent application Ser. No. 218,893, filed Jul. 14, 1988, for "CONVEYOR LUBRICANT CONTAINING ALKYL AMINE COUPLING AGENTS, now U.S. Pat. No. 4,929,375, the disclosure of which is hereby incorporated by reference.

BACKGROUND OF THE INVENTION

1. Field of the Invention

The present invention relates to diamine lubricant compositions. More particularly, the present invention relates to highly alkaline diamine track lubricant compositions. Even more particularly, the present invention relates to highly alkaline alkyl diamine track lubricant compositions which contain biocides and/or corrosion inhibitors.

2. Prior Art

In the latest above-referred to copending application there is disclosed an alkyl diamine track lubricant which is alkaline and which inhibits stress cracking in PET articles. While this amine lubricant is efficacious for the purposes disclosed therein, certain disadvantages still are encountered in utilizing such a track lubricant in certain environments.

As is known to those skilled in the art to which the present invention pertains, aqueous use solutions of alkyl diamine track lubricants have a tendency to rust mild steel and to create and deposit an unsightly black soil or sludge, especially around brewery or other beverage product fillers. Moreover, such lubricants do not achieve the optimally desired biocidal levels.

Thus, it is to be appreciated that a major advance in the art would be achieved if there existed an alkyl diamine track lubricant which minimized rusting of mild steel tracks and sludge creation, while exhibiting enhanced biocidal activity. It is to this to which the present invention is directed.

SUMMARY OF THE INVENTION

According to the present invention there is provided improved highly alkaline alkyl diamine lubricants made from lubricant concentrates which are prepared by admixing with the diamine a water-soluble hydrotrope for the diamine.

Preferably, the water-soluble hydrotrope is an ethoxylated hydrotrope. By using the ethoxylated hydrotrope the diamine is solubilized into solution due to the emulsifying nature of the hydrotrope. Likewise, the hydrotrope enables the introduction of quaternary ammonium-type biocides into both the concentrate and use solution.

The present concentrate further includes a corrosion inhibitor. Preferably, the corrosion inhibitor is, also, a reducing agent. Useful corrosion inhibitors which, also, are reducing agents, include sodium nitrite, sodium thiosulfate, sodium metabisulfate and the like, as well as mixtures thereof. Other useful corrosion inhibitors, although not reducing agents, include mercaptobenzothiazole, sodium benzoate and the like, as well as mixtures thereof.

Suitable biocides which may be included are the quaternary ammonium-type compounds.

A source of alkalinity is, also, included to raise the pH levels of the use solution to the desired range. In accordance herewith the diamine component is not neutralized.

The lubricants prepared from the concentrate are highly alkaline having a pH≧8.0 and preferably a pH of from between about pH 9.0 to about pH 13.0.

The use solutions are prepared by admixing the concentrate with water. Generally, the use solution contains one part of concentrate per about 1/100 to about 1/1000 part of water.

While the present compositions do not inhibit stress cracking, they do minimize rusting of mild steel conveyors and considerably reduce black soil formation, while permitting the introduction of a biocide thereinto.

For a more complete understanding of the present invention references made to the following detailed description and accompanying examples.

DESCRIPTION OF THE PREFERRED EMBODIMENT

In accordance with the present invention there is provided an alkyl diamine track lubricant having a pH greater than 8, which generally comprises:

(a) a diamine lubricant, (b) a water-soluble ethoxylated hydrotrope, a corrosin inhibitor, (d) a source of alkalinity, and (e) water.

A biocide may, also, be included herewith.

The lubricant is prepared from a lubricant concentrate, generally, comprising, by weight:

(a) from about 0.5 to about 15 percent of the diamine, (b) from about 1 to about 30 percent of the hydrotrope, and (c) from about 0 to about 15 percent of the biocide, (d) from about 1 to about 15 percent of the corrosion inhibitor, (e) an effective amount of the source of alkalinity sufficient to raise the pH of the use solution to a pH≧8, and (f) the balance being water.

Preferably, the concentrate comprises:

(a) from about 1 to about 10 percent of the diamine.

(b) from about 4 to about 20 percent of the hydrotrope, (c) from about 1 to about 10 percent of the biocide, (d) from about 5 to about 10 percent of the reducing corossion inhibitor, (e) from about 0.5 to about 1.0 percent of the source of alkalinity, and (f) the balance being water.

The lubricant is prepared by diluting the concentrate with water in a volumetric ratio of concentrate to water ranging from about 1/100 to about 1/1000 and, preferably, from about 1/200 to about 1/800.

Heretofore, and as shown in the prior art, diamine lubricants have been neutralized with a weak acid, such as acetic acid or the like. Herein, no such neutralization occurs. Rather, the unnaturalized diamine, which is alkaline, is emulsified into aqueous solution using the water-soluble hydrotrope. It is noteworthy that, traditionally, the diamine lubricants are insoluble in water. Therefore, the use of the water-soluble hydrotrope enables the formation of a water-soluble lubricant having a pH greater than 8.

The oil-soluble diamines used herein are, preferably, primary amines having an alkylene residue which may be straight chain or branched, containing from 8 to 24 carbon atoms and, preferably, 10 to 18 carbon atoms. Preferably, the alkylene group further contains unsaturation.

Preferably, the fatty alkyl diamines used herein, generally, correspond to the formula:

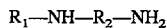

$R_1-NH-R_2-NH_2$ wherein $R_1$ and $R_2$ are each linear alkyl, $R_1$ being a $C_8$ to $C_{24}$ alkyl and $R_2$ being a $C_1$ to $C_3$ alkyl group. Examples of suitable diamines are oleyldiamine, cocodiamine, myristyl diamine, linoleyldiamine, stearyldiamine, 2-ethyldodecane diamine, and the like. Mixtures of diamines may be used.

The diamines contemplated for use herein are available from several commercial sources, such as the oleyldiamine from Witco Chemical, sold under the name Adogen® 572.

Typically, the diamine is present in the use solution as a free base diamine.

Any water-soluble hydrotrope which can hydrotrope the diamine can be used herein. Among the useful hydrotropes are, preferably, alkoxylated amines and nonionic surfactants. The amines may be alkoxylated monoamines, diamines, triamines, tetraamines, pentaamines and the like. These amines may be substituted or unsubstituted. While these amines may contain other alkoxylates, they must contain sufficient moles of ethylene oxide to enable the hydrotroping of the diamine into the aqueous system.

Generally, the ethoxylated amine hydrotrope is an alkyl amine having at least six carbon atoms in the alkyl portion. The amine may be a primary, a secondary and/or a tertiary amine.

The alkoxylated alkyl amines which can be employed in this invention have the general formula:

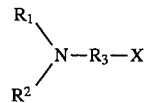

wherein $R_1$ and $R_2$ are either hydrogen, alkoxylate, or alkyl, $R_3$ is an unsubstituted linear alkyl group having from 6 to 12 carbon atoms and, preferably, from 6 to 10 carbon atoms and X is an alkoxylate group.

Preferably, the hydrotrope is an oxyalkylated amine selected from the group consisting of oxyalkylated N-alkylamines and oxyalkylated N-alkyl-alkylenediamines. Examples of oxyalklated N-alkylamines are the oxyalkylated fatty amines such as oxyalkylated N-cocoamine, N-stearylamine, N-palmitylamine, and the like.

The N-alkyl group should have from 8 to about 24 carbon atoms, preferably 12–20 carbon atoms, and more preferably, 15–18 carbon atoms. This group may be unsaturated, having from 1–4 sites of unsaturation, preferably 1–2 sites of unsaturation. Such amines correspond to the formula: R—NHC where R is a $C_{18}$–$C_{24}$ alkyl or alkenyl group.

The poryoxalkylene ether portion of the oxyalkylated N-alkylamine is preferably derived completely from ethylene oxide, and is, thus, a polyoxyethylated N-alkylamine. However, block and heteric polyoxyethylene/polyoxypropylene copolymeric N-alkylamines are also suitable, particularly, those block copolymers having an internal polyoxyethylene block capped with a polyoxypropylene block. Use of other alkylene oxides such as butylene oxide, amylene oxide, and the higher alkylene oxides such as the Vikolox® alkyrene oxides having from 8–18 carbon atoms in the alkylene residue are also suitable. If alkylene oxides with a $C_8$ or greater alkylene residue are used, then not more than about 4 mores of said alkylene oxide, preferably 2 moles should be used, as a cap. Preferably, the oxyalkylation is performed with substantially all ethylene oxide. From 6 to about 40 moles, preferably from 10 to about 30 moles, and most preferably, from 12 to about 16 moles of ethylene oxide should be used.

The N-alkyl-alkylenediamines correspond to the formulae:

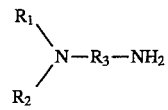

These are oxyalkylated preferably in the same manner as the oxyalkylated N-alkylamines, i. e. under suitable oxyalkylation conditions known to the skilled artisan. $R_1$ is preferably a $C_8$–$C_{20}$ linear or branched alkyl group, optionally containing unsaturation, more preferably a $C_{12}$–$C_{18}$ alkyl, and most preferably $C_{15}$–$C_{18}$ alkyl. $R_2$ is an alkylene residue containing from 2 to 6 carbon atoms, preferably 3–6 carbon atoms, for example 1,3-propylene, 1,4-butylene, 1,5-pentylene, or 1,6-hexylene (1,6-hexamethylene). Most preferably, $R_2$ is trimethylene, $R^1$ is $C_{13}$–$C_{15}$, and the oxyalkylation is all ethylene oxide derived. A suitable oxyalkylated N-alkyl alkylenediamine is Synprolam® 35 3N×10, available from Imperial Chemical Inc. (ICI).

Among the useful alkoxylated amines are the ethoxylated amines such as, for example, oleyl (ethoxylated) amine, tallow (ethoxylated) amine, coconut (ethoxylated) amine, as well as mixtures thereof. These compounds are well known and commercially available.

As noted hereinabove, the amine hydrotrope is employed as the free-base amine.

In many instances the present alkoxylated amine hydrotropes may be defined classically as nonionic surfactants, depending on the degree of alkoxylation. However, it is not essential to the present invention that the ethoxylated amine be a nonionic surfactant, only that it be capable of hydrotroping the diamine. Moreover, the diamines are optimally employed herein because of their compatibility with the biocides.

Another useful class of hydrotropes are the well-known and commercially available water-soluble nonionic surfactants.

The nonionic surfactants which are advantageously employed in the compositions of the present invention are basically the polyoxyalkylene adducts of hydrophobic bases wherein the oxyalkylene portion of the molecule includes ethylene oxide, butadiene dioxide and glycidol, mixtures of these alkylene oxides with each other and with minor amounts of propylene oxide, butylene oxide, amylene oxide, styrene oxide, and other higher molecular weight alkylene oxides. Ethylene oxide, for example, is condensed with the hydrophobic base in an amount sufficient to impart water dispersibility or solubility and surface active properties to the molecule being prepared. The exact amount of ethylene oxide condensed with the hydrophobic base will depend upon the chemical characteristics of the base employed and is readily apparent to those of ordinary skill in the art relating to the synthesis of oxyalkylene surfactant condensates. Typical hydrophobic bases which can be condensed with ethylene oxide in order to prepare nonionic surface active agents include mono-and polyalkylphenols, polyoxypropylene condensed with a base having from about 1 to 6 carbon atoms and at least one reactive hydrogen atom, fatty acids, fatty amines, other than those enumerated above, fatty amides and fatty alcohols. The hydrocarbon ethers such as the benzyl or lower alkyl ether of the polyoxyethylene surfactant condensates are also advantageously employed in the compositions of the invention.

Among the suitable nonionic surface active agents are the polyoxyethylene condensates of alkylphenols having from about 6 to 20 carbon atoms in the alkyl portion and from about 5 to 15 ethenoxy groups in the polyoxyethylene radical. The alkyl substituent on the aromatic nucleus may be octyl, diamyl, n-dodecyl, polymerized propylene such as propylene tetramer and trimer, isoctyl, nonyl, etc. The benzyl ethers of the polyoxyethylene condensates of monoalkyl phenols impart good properties to the compositions of the invention. A typical product corresponds to the formula:

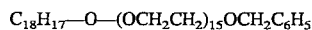

Higher polyalkyloxyethylated phenols corresponding to the formula:

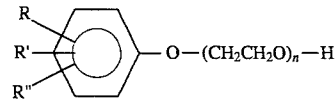

wherein R is hydrogen or an alkyl radical having from abut 1 to 12 carbon atoms, R' and R" are alkyl radicals having from about 6 to 16 carbon atoms and n has a value from about 10 to 40, are also suitable as nonionic surfactants. A typical oxyethylated polyalkylphenol is dinonylphenol condensed with 14 moles of ethylene oxide.

Other suitable nonionic surface active agents are cogeneric mixtures of conjugated polyoxyalkylene compounds containing in their structure at least one hydrophobic oxyalkylene chain.

Polymers of oxyalkylene groups obtained from propylene oxide, butylene, oxide, amylene oxide, styrene oxide, mixtures of such oxyalkylene groups with each other and with minor amounts of polyoxyalkylene groups obtained from ethylene oxide, butadiene dioxide, and glycidol are illustrative of hydrophobic oxyalkylene chains. Polymers of oxyalkylene groups obtained from ethylene oxide, butadiene dioxide, glycidol, mixtures of such oxyalkylene groups with each other and with minor amounts of oxyalkylene groups obtained from propylene oxide, butylene oxide, amylene oxide, and styrene oxide are illustrative of hydrophilic oxyalkylene chains.

Further suitable nonionic surface active agents are the polyoxyethylene esters of higher fatty acids having from about 8 to 22 carbon atoms in the acyl group and from 8 to 15 ethanoxy units in the oxyethylene portion.

Typical products are the polyoxyethylene adducts of tall oil, rosin acids, lauric, stearic and oleic acids and the like. Additional, nonionic surface active agents are the polyoxyethylene condensates of higher fatty acid amines and amides having from about 8 to 22 carbon atoms in the fatty alkyl or acyl group and about 10 to 15 ethanoxy units in the oxyethylene portion. Illustrative products are coconut oil, fatty acid amines and amides condensed with about 10 to 15 moles of ethylene oxide.

Other suitable polyoxyalkylene nonionic surface active agents are the alkylene oxide adducts of higher aliphatic alcohols and thioalcohols having from about 8 to 22 carbon atoms in the aliphatic portion and about 3 to 15 carbon atoms in the oxyalkylene portion. Typical products are the synthetic fatty alcohols, such as n-decyl, n-undecyl, n-dodecyl, n-tridecyl, n-tetradecyl, n-hexadecyl, n-octdadecyl and mixtures thereof condensed with 3 to 15 moles of ethylene oxide, a mixture of normal fatty alcohols condensed with 9 to 20 moles of ethylene oxide and 3 to 10 moles of propylene oxide, in either order; or a mixture of normal fatty alcohols condensed with a mixture of propylene and ethylene oxides, or a linear secondary alcohol condensed with 3 to 10 moles of ethylene oxide, or a linear secondary alcohol condensed with a mixture of propylene and ethylene oxides, or a linear secondary alcohol condensed with a mixture of ethylene, propylene and higher alkylene oxides.

As noted, these surfactants are well known and commercially available such as those sold by BASF under the name Pluronic and Tetronic, as well as those sold by Union Carbide under the name Tergitol.

Generally, the hydrotrope and diamine are present in respective weight ratio of about 2:1.

The biocide which may be included herewith is, preferably, a quaternary ammonium chloride-type biocide well-known to the skilled artisan and which, generally, corresponds to the formula:

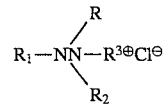

wherein R, $R_1$, $R_2$, and $R_3$ are each, individually, selected from the group of hydrogen, $C_1$ to $C_{12}$ alkyl groups, or aryl.

The composition hereof, also, includes a corrosion inhibitor which, preferably, is a reducing agent, as well. The corrosion inhibitor minimizes the rusting of a mild stainless steel or plastic track conveyor. Although not as efficacious as a reducing agent-corrosion inhibitor, other corrosion inhibitors may be used herein. Among the useful compounds are sodium nitrate, sodium thiosulfate, sodium bisulfate, mercaptobenzothiozale, sodium benzoate, substituted imidazoline derivatives including the substituted imidazoline of coco fatty acid and the like. Mixtures of corrosion inhibitor-reducing agents may be used. Preferably, sodium nitrite is employed since it is both a reducing agent and corrosion inhibitor. It has been observed that the presence of the nitrite in the present lubricant precludes the rusting and the formation of black soil or sludge heretofore encountered in breweries.

The source of alkalinity is used to elevate the pH of the lubricant to the desired levels and contributes to the cleaning. Although not wishing to be bound by any theory, it is believed that by raising the pH to the elevated levels contemplated herein rust prevention and soil prevention is enhanced. Also, it is believed that the elevated pH keeps the diamine in the insoluble free base state, thereby minimizing its contribution to oxidation reactions.

Any source of compatible alkalinity may be used such as carbonates, metasilicates, bicarbonates, hydroxides and the like, as well as mixtures thereof, may be used. Preferably, a strong base such as sodium hydroxide, potassium hydroxide, etc., or the like is employed as the alkaline source.

It should be noted that in selecting the diamine and an amine hydrotrope, optimally, the alkyl portion of the diamine has about the same carbon chain length as the alkyl portion of the amine.

Generally, the concentrate has a pH of from about 11.0 to about 13.0.

Also, and as noted above, the present track lubricants are particularly useful on mild steel, stainless steel, plastic track conveyors, such as are used for filling glass, aluminum and two-piece PET containers.

The lubricant use solutions hereof, which are advantageously supplied in the form of concentrates which are subsequently, preferably, diluted with water for use, also may contain additional ingredients such as defoamers, algaecides, etc., which may either be incorporated into the concentrate or added to the use solution.

In preparing the diamine lubricant concentrate hereof, the components are admixed together. Ordinarily, the water is warmed to about 100° F. to about 130° F. and the other ingredients are added thereto. In preparing the use solution, the concentrate is added to the requisite amount of water, usually, at room temperature.

The lubricant compositon is not, under ordinary conditions, affected by water hardness. Consequently, water softeners, which are usually employed with fatty acid-type soap lubricants, are not necessary for the diamine lubricants hereof. As noted, the use solution has a pH$\geq$8 and, usually, ranging from about 9.0 to about 13.0, and, preferably, from about 10.0 to about 11.5.

For a more complete understanding of the present invention, reference is made to the following non-limiting examples. In the examples, which are to be construed as illustrative, rather than limitative, of the present invention, all parts are by weight absent indications to the contrary.

EXAMPLE I

This example illustrates the preparation of a diamine lubricant concentrate in accordance with the present invention.

Into a suitable container equipped with stirring means and at ambient temperatures is mixed the following:

| Ingredient | Amt., pbw |
|---|---|
| Diamine[1] | 5.0 |
| Water-Soluble Amine Hydrotrope[2] | 10.0 |
| Quaternary Ammonium Compound[3] | 9.0 |
| Potassium Hydroxide, 45% | 0.6 |
| Sodium Nitrite | 5.0 |
| Water | 70.4 |

[1] an alkyl diamine sold by Witco Chemical under the name Adogen 572
[2] an alkyl (ethoxylated) amine sold by Witco Chemical under the name Varonic K215
[3] a commercially available product sold by Stepan Chemical under the name BTC 2125

EXAMPLE II

Following the procedure of Example I, a diamine lubricant concentrate, in accordance with the present invention, is prepared from the following:

| Ingredient | Amount, pbw |
|---|---|
| Diamine[1] | 5.0 |
| Water-Soluble Amine Hydrotrope[2] | 10.0 |
| Potassium Hydroxide, 45% | 0.6 |
| Sodium Nitrite | 9.9 |
| Water | 74.5 |

[1] Same as Ex. I
[2] Same as Ex. I

EXAMPLE III

Following the procedure of Example I, a diamine lubricant concentrate was prepared from the following:

| Ingredient | Amount, pbw |
|---|---|
| Diamine[1] | 3.0 |
| Nonionic Surfactant[2] | 16.0 |
| KOH, 45% | 0.5 |
| Sodium Nitrite | 1.0 |
| Water | 79.5 |

[1] Same as Ex. I
[2] an ethoxylated nonylphenol sold by Union Carbide under the name Tergitol NP-9.

EXAMPLE IV

To test the efficacy of the present invention on corrosion inhibition and sludge formation, a 0.25% use solution is prepared by admixing 25 parts of the concentrate of Example II with 1000 parts of water in a suitable container and at room temperature.

A 1"×3" 1010 carbon steel coupon is then immersed in the lubricant such that approximately one half of the coupon is immersed in the lubricant and the other half is in the atmosphere.

The coupon is then visually observed for rusting. After 21 days in the lubricant no rusting is visually apparent.

EXAMPLE IV

Example III is repeated except that 40 parts of beer is added to the 160 parts of the 0.25% lubricant use solution.

After 5 days neither rusting nor sludge is observed on the coupons immersed in the lubricant.

From the above it is to be seen that by using water-soluble hydrotropes and, in particular, ethoxylated amines and/or nonionic surfactants, alkaline diamine lubricants are provided which can be used on various containers and articles with a lessening of corrosivity, while providing excellent lubricity, cleaning and the like.

Having, thus, described the invention what is claimed is:

1. A synthetic diamine-based track lubricant, comprising:
   (a) an alkyl diamine,
   (b) a water-soluble hydrotrope selected from the group consisting of ethoxylated alkyl amines, having at least 6 carbon atoms in the alkyl portion, nonionic surfactants and mixtures thereof,
   (c) a source of alkalinity,
   (d) a corrosion inhibitor,
   (e) water, and
   wherein the lubricant has a pH greater than 8 and the diamine is not neutralized.
2. The lubricant of claim 1 which further comprises:

a quaternary ammonium biocide.

3. The lubricant of claim 1 wherein:

the water-soluble amine is selected from the group consisting of coconut (ethoxylated) amine, oleyl (ethoxylated) amine, tallow (ethoxylated) amine and mixtures thereof.

4. The lubricant of claim 1 wherein:

the hydrotrope is the amine, the amine being present as a free-base amine.

5. The lubricant of claim 1 wherein the hydrotrope and diamine are present in a respective weight ratio of about 2:1.

6. The lubricant of claim 1 wherein the corrosion inhibitor is a reducing agent.

7. A synthetic diamine track lubricant concentrate, comprising:

(a) an alkyl diamine, (b) a water-soluble hydrotrope selected from the group consisting of ethoxylated alkyl amines having at least 6 carbon atoms in the alkyl portion, nonionic surfactants and mixtures thereof, (c) a water-soluble reducing agent, (d) water, and wherein the diamine is not neutralized, and the concentrate has a pH between about 11.5 to about 13.0.

8. The concentrate of claim 7, which further comprises:

a source of alkalinity, the source of alkalinity being present in sufficient amount such that a use solution prepared therefrom has a pH greater than 8.

9. The concentrate of claim 7 which further comprises:

a quaternary ammonium chloride biocide.

10. The lubricant concentrate of claim 7 which further comprises, by weight:

(a) from about 0.5 to about 15 percent of the diamine;

(b) from about 1 to about 30 percent of the hydrotrope;

(c) from about 1 to about 15 percent of the reducing agent;

(d) an effective amount of the source of alkalinity sufficient to raise the pH of a lubricant prepared therefrom to a pH greater than 8;

(e) from about 0 to about 15 percent of a biocide, and (f) the balance being water.

11. The concentrate of claim 10 wherein:

the hydrotrope is an ethoxylated alkyl amine having at least 6 carbon atoms in the alkyl portion.

12. The concentrate of claim 11 wherein:

the hydrotrope is selected from the group consisting of coconut (ethoxylated) amine, oleyl (ethoxylated) amine, tallow (ethoxylated) amine and mixtures thereof.

13. The concentrate of claim 12 wherein:

the hydrotrope and diamine are present in a respective weight ratio of about 2.1.

14. The concentrate of claim 7 wherein:

the hydrotrope and diamine are present in a respective weight ratio of about 2:1.

15. A synthetic diamine track lubricant comprising:

(a) water, and (b) the concentrate of claim 13, the lubricant comprising one part by weight of the concentrate per about 100 to about 1000 parts by weight of water.

* * * * *